Patented June 10, 1952

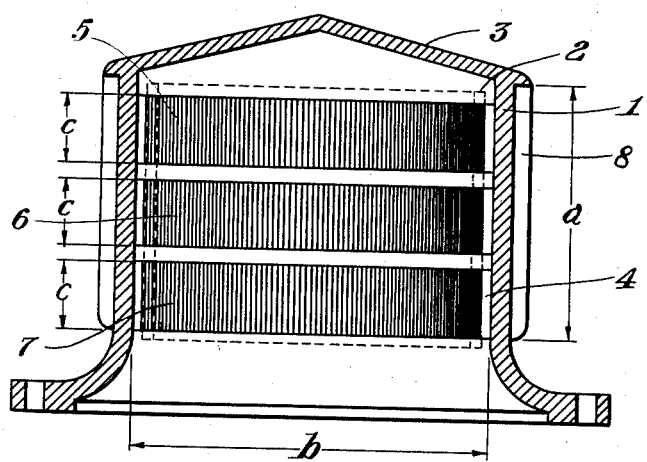
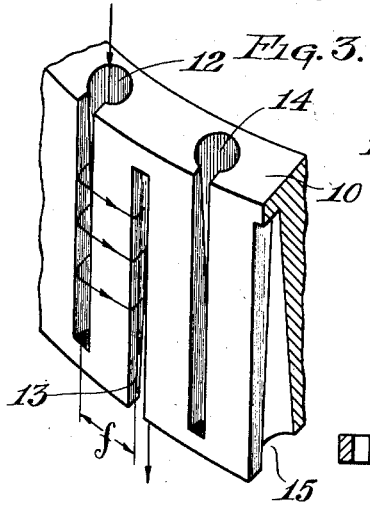
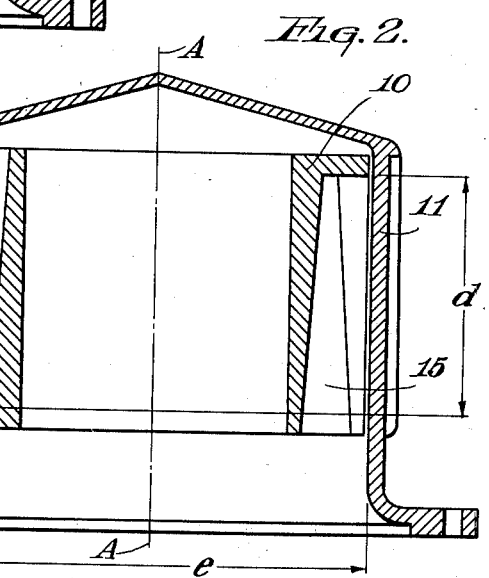
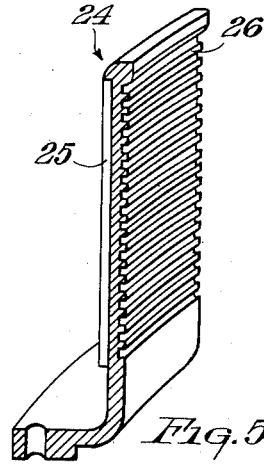
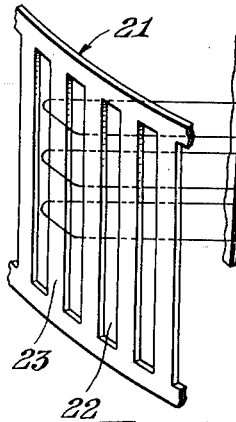
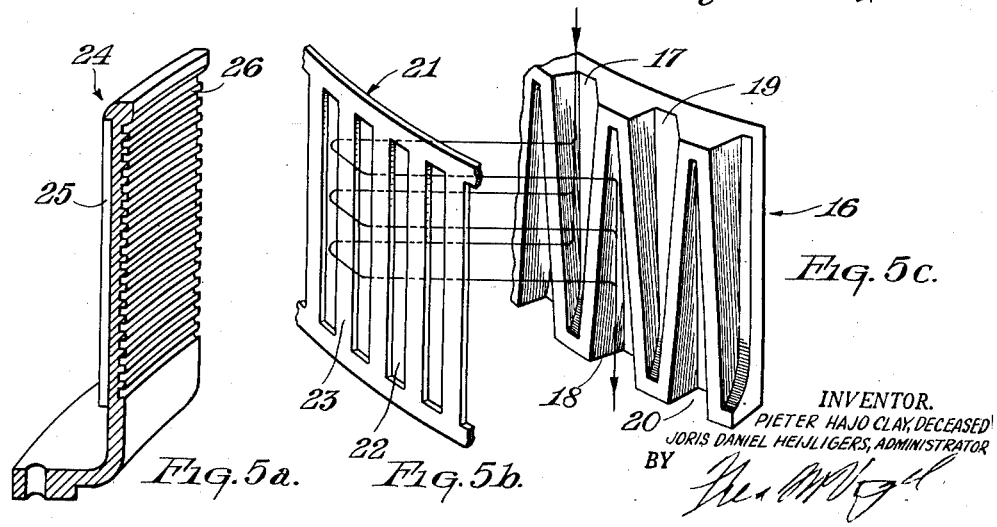
INVENTOR.
PIETER HAJO CLAY, DECEASED
JORIS DANIEL HEIJLIGERS, ADMINISTRATOR
BY
AGENT June 10, 1952   P. H. CLAY   2,599,611
HEAT EXCHANGER FOR HOT GAS PISTON ENGINES
Filed Oct. 30, 1946   2 SHEETS—SHEET 2
Fig. 4.
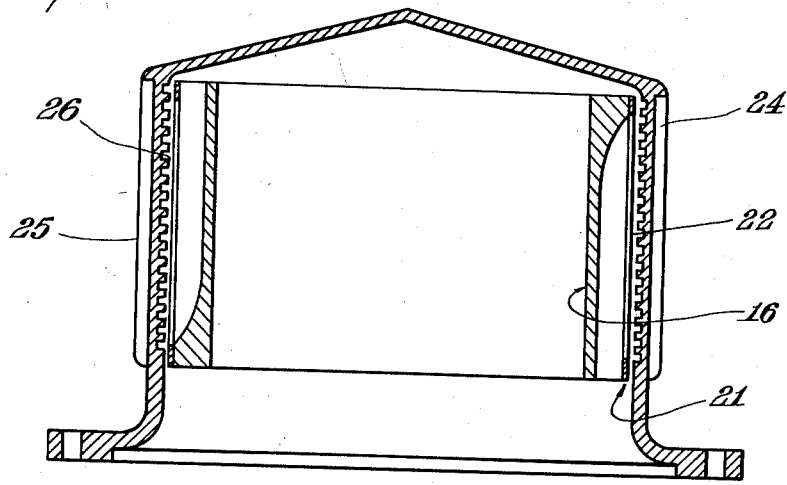
Fig. 6.
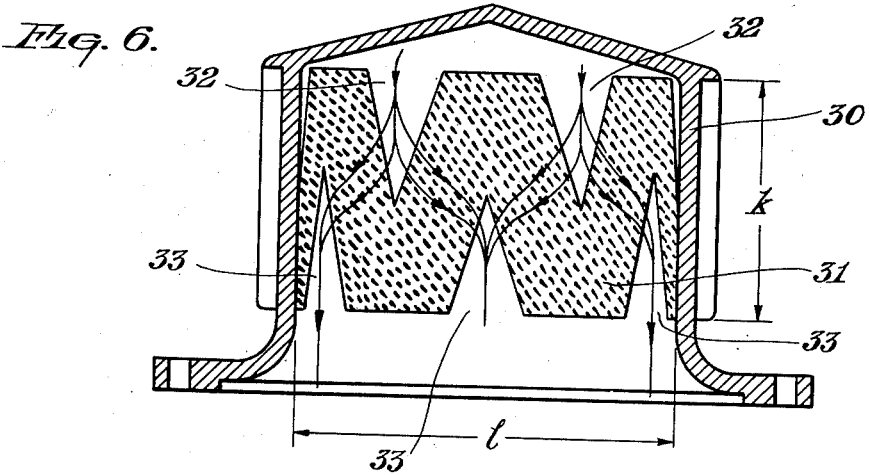
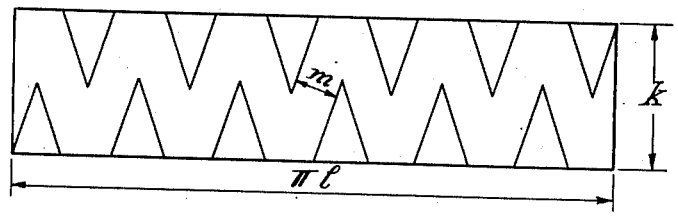
Fig. 7.
INVENTOR.
PIETER HAJO CLAY, DECEASED
JORIS DANIEL HEIJLIGERS, ADMINISTRATOR
BY
AGENT.

2,599,611

UNITED STATES PATENT OFFICE 2,599,611

HEAT EXCHANGER FOR HOT GAS PISTON ENGINES

Pieter Hajo Clay, deceased, late of Eindhoven, Netherlands, by Joris Daniel Heijligers, administrator, Eindhoven, Netherlands, assignor to Hartford National Bank and Trust Company, Hartford, Conn., as trustee Application October 30, 1946, Serial No. 706,535
In the Netherlands August 7, 1945

Section 1, Public Law 690, August 8, 1946
Patent expires August 7, 1965

4 Claims. (Cl. 257—261)

It is known to construct the heat exchanger of hot-gas piston engines in such a manner that the flow of the medium is subdivided and is caused to exchange heat, in the subdivided state, with the wall of the heat exchanger. In the case of hot-gas piston engines it is generally of paramount importance that the heat exchange should occur with a high efficiency, occupy little time and at a slight resistance for the medium which is in thermal contact with the wall. These conditions are not satisfied or only to a minor extent fulfilled by most of the conventional constructions.

The object of the invention is to provide a construction for the heat exchanger of a hot-gas piston engine in which these drawbacks are obviated and in which, moreover, the clearance space in the engine may become small.

In this regard a "hot-gas piston engine" is to be understood to mean a piston engine for converting caloric energy into mechanical energy or of mechanical energy into caloric energy, in which a constantly gaseous medium of invariable chemical composition performs an open or a closed cycle. The hot-gas piston engine may consequently be a hot-gas engine, or again a refrigerating machine operating according to the reversed hot-gas engine principle. The heat exchanger according to the invention may be used for supplying caloric energy to the working medium of the engine or for withdrawing caloric energy from this medium. The said cylindrical wall will, as a rule, constitute the partition between two media, between which the exchange of heat has to take place. In the hot-gas engine according to the invention this wall constitutes the partition between the working medium of the engine and, for example, the combustion gases of a heating device e. g. a burner, or between the medium and another gaseous or liquid medium which has a cooling function. Though the heat exchanging means according to the present invention may also be used in a hot-gas engine on the side of the wall where the combustion gases or the cooling medium are located, these means will, however, particularly be used on that side of the wall where the working medium of the engine is located. In a refrigerating machine operating on the reversed hot-gas engine principle, on the contrary, the heat exchanging means will preferably be used on the side of the wall where the substance (gas or liquid) to be cooled is located.

The hot-gas piston engine according to the invention, wherein the medium, in subdivided state, exchanges heat with the cylindrical wall of the heat exchanger, is characterized in that at least on one of the sides of the wall with which the medium is in thermal contact, there are provided means to bring the medium in situ in intimate thermal contact, through a plurality of parallel ways, each of which has a length of at most ⅓ of one of the dimensions (height and diameter) of this wall, with this wall or with heat exchanging means on this wall, the surface portion of this wall, where the medium is in an intimate contact with this wall or with heat exchanging means on this wall, amounting at least to half the total surface of the said wall.

As a rule, the said ways will have a maximum length of one third of the smaller dimension of the wall. Sometimes, however, for example if the two dimensions (diameter and height) are only slightly different, the said ways may be chosen to be larger than one third of the smaller dimension of the wall, but smaller than one third of the larger dimension of the wall, without experiencing trouble in respect of the resistance of flow of the medium. The ways for the medium may, as an alternative, be given the latter value if the viscosity of the medium has a very low value. If the medium, during the heat exchange with the wall, contacts only or substantially solely with the heat exchanging means on the wall, and consequently not with the wall itself, the surface of the wall portion provided with these means amounts at least to half the total surface of the wall.

In the present case the term "cylinder" is to be understood to mean a surface which is formed by the movement of a line parallel with itself along a closed, continuous line (for instance a circle) or along a closed broken line or a surface at least substantailly having this shape.

In order to reduce the resistance experienced by the medium use is made, according to the invention, of a large number of parallel ways for the medium, with the result that the speed at which the medium traverses the heat exchanger is low which is beneficial to the heat exchange. To prevent the current of heat from attaining an undue value per surface unit of the heat exchanger, the construction of the heat exchanger according to the invention is such that at least over half the surface of the cylindrical wall, the medium is in an intimate contact with the wall or with the heat exchanging means on this wall. The wall with which the medium is in thermal contact may be smooth or, as has been said before, it may be provided with heat exchanging means. The latter may, for example, consist of projections e. g. ribs. Ribs for increasing the heat transfer are known per se. Owing to the satisfactory properties of the heat exchanger according to the invention, however, it is sufficient to use shorter projections than those of the conventional heat exchanger. Apart from thus securing the general advantage of saving material the special advantage is obtained that the clearance space in the hot-gas piston engine is smaller than if no use is made of the fundamental idea of the invention. By reducing the clearance space of a hot-gas piston engine the specific power of the engine is raised.

In order to use the available surface of the wall having a given diameter to the best advantage it is, according to one embodiment of the invention, advisable to arrange the parallel paths, where the medium is in intimate contact with the wall or with the heat exchanging means on the wall, to be at an angle with the axis of the cylindrical wall. This will, in general, mean that the wall is used over a larger height for heat transfer than if this particular expedient is not utilized. In order to reduce the height of the wall, where the heat transfer takes place, the inlet and outlet channels will, according to the invention, be so positioned relatively to one another as to be interfitted. According to one embodiment of the invention, it is advisable that at least one of the cross dimensions of these channels should vary gradually.

In a further form of construction of the hot-gas piston engine according to the invention a cylindrical casing, the wall of which comprises inlet and outlet channels for the medium, is provided at the inner side of the cylindrical wall and at a certain distance therefrom, the medium—in the present case the working medium of the engine—coming, upon leaving these inlet channels, in intimate contact with the wall or with the heat exchanging means arranged on it and then being carried off through the outlet channels in the casing. It has been found that in this manner a particularly satisfactory heater or a cooler for a hot-gas piston-engine is obtainable. For example, to simplify the manufacture of the internal casing the procedure according to the invention may be such that the internal casing is directly surrounded by a second jacket, which is slightly spaced apart therefrom and provided with slits substantially corresponding with the channels of the casing. The inner side of the wall, through which the heat exchange takes place may be provided with a number of annular ribs, which are contributive to the heat exchange.

In a further form of construction of the hot-gas piston-engine according to the invention the cylindrical wall is provided on one or both sides with a large number of pin-shaped elevations arranged in a staggered position. The medium which has to exchange heat with the wall will generally follow the way of least resistance on passing the pin-shaped elevations and, though these elevations would, in principle, permit the medium to follow various paths, it will generally pass these elevations in such manner that the paths followed enclose an angle with the axis of the cylindrical jacket.

In order that the invention will be clearly understood and readily carried into effect, it will now be described more fully with reference to the accompanying drawing.

Fig. 1 is a longitudinal sectional view of one form of construction of the heat exchanger for the hot-gas piston-engine according to the invention.

Fig. 2 is a longitudinal sectional view of another form of construction.

Fig. 3 is a perspective sketch of part of the internal jacket shown in Fig. 2. This jacket comprises the inlet and outlet channels for the working medium of the engine towards and away from the wall.

Fig. 4 is a longitudinal section of a further form of construction of a heat exchanger for the hot-gas piston-engine according to the invention.

Figs. 5a, 5b and 5c are perspective views of parts of the engine head and of the two jackets, the paths followed by the medium being represented, at the same time, on a greatly exaggerated scale.

Fig. 6 represents a modified form of construction of the heat exchanger.

Fig. 7 is an exploded view of the inner side of the wall of the engine head shown in Fig. 6.

Figs. 1 to 7 relate to forms of construction of a device according to the invention, which is intended as a heat exchanger in a hot-gas piston-engine, for instance a hot-gas engine or a cooling machine operating according to the reverse hot-gas engine principle.

Fig. 1 is a cross-section of the head of a hot-gas engine. In this head 1 is movable the displacer of such an engine, which displacer has an outer diameter practically corresponding to the inner diameter of the internal casing 2 indicated in dotted lines. When the displacer is moving upwards the medium in the engine is forced by this displacer along the upper side 3 of the head and through the annular space 4 at the outside of the casing 2. On the inner wall of the cylindrical portion of the head 1 are provided a large number of ribs in three fields 5, 6 and 7. During operation the outer wall of the head is heated by means of a burner (not represented). As a result thereof the head, more particularly the cylindrical part thereof, is heated owing to the ribs 8 on the outer wall, the gas contained in the space 4 being likewise heated. Owing to the fact that the ducts between the ribs in any of the fields 5, 6 and 7 have a comparatively small length $c$, the resistance experienced by the gases in these ducts is low. On the other hand the medium is forced through a large number of ducts, so that both the quantity of gas per duct and the speed of the gas are small. Due to this the medium is heated very intensively. As appears from the drawing the length $c$ of each duct is smaller than ⅓ of the height $a$ or the diameter $b$ of the head, which dimensions $a$ and $b$ are the dimensions of the cylindrical wall through which the exchange of heat takes place. Furthermore it appears from the drawing that the heat exchanging means i.e. the ribs in the fields 5, 6 and 7 practically occupy the whole surface of this wall.

In the form of construction shown in Figs. 2 and 3 the parallel-connected paths, where the medium intimately contacts with the wall, extend about perpendicularly to the axis of the cylindrical envelope. The inner casing 10 which, as appears more particularly from Fig. 2, is slightly spaced apart from the cylindrical part 11 of the head of the engine, comprises ducts 12, 13, 14 and 15 all of which extend parallel with the axis A—A of the envelope 11. When the medium to be heated is flowing through the heater, the ducts 12 and 14 serve for the supply of the medium to be heated, the ducts 13 and 15 serving for the outlet thereof. As appears more particularly from Fig. 3 the ducts 12 and 14 extend between the channels 13 and 15. All these ducts are open at the outside. Owing to this a communication exists between the supply and outlet ducts through the intermediary of the space between the outer wall of the casing 10 and the inner wall of the cylindrical part 11 of the head of the engine. The path followed by the gases is shown in Fig. 3 in regard to the ducts 12 and 13, from which it appears that in this form of construction the paths of the gas having a length $f$ extend substantially normally to the axis A—A of the cylindrical envelope. From the drawing it appears that the length $f$ is very small with respect to the dimensions (height and diameter) $d$ and $e$ of the cylindrical wall through which the exchange of heat has to take place. In this case, furthermore, practically the whole surface of the wall partakes in the exchange of heat. In the way set out above it is ensured that a very large surface, which is in heat-exchanging contact with a medium to be heated, contacts over very short paths with the gas to be heated, though the diameter of the exchanger is comparatively small. As appears from the drawing all the ducts 12, 13, 14 and 15 slightly taper in conjunction with the quantity of gas traversing the ducts per section.

Figs. 4, 5a, 5b and 5c represent a heat exchanger which principally corresponds to the exchanger shown in Figs. 2 and 3 but the manufacture of the inner envelope 16 is simpler. In fact, the supply and outlet ducts 17, 18, 19 and 20 can be provided in a simpler manner than in the construction shown in Figs. 2 and 3, since in this construction a casing 21 directly engages the outer wall of the casing 16, and comprises elongated rectangular slits 22, the pitch of which corresponds to the pitch of the ducts in the casing 16. From Figs. 5b and 5c clearly appears how these two casings are formed. For an easy view the spacing between the casings 21 and 16 is exaggerated in Figs. 5b and 5c. In this figure is also shown how the medium to be heated is forced through these casings. By varying the width of the ducts 23 between the slits 22 the length of the gas ways are variable. As appears from Fig. 5a not only the outer wall of the cylindrical part 24 of the head is provided with ridges 25 but also the inner wall of this part is furnished with continuous ridges 26 by which the contact between the medium to be heated and the wall 24 is rendered still more intimate.

Figs. 6 and 7 represent another form of construction of a heater for a hot-gas engine, which is realised according to the invention. In this form of construction a very large number of pin-shaped elevations are provided in a zig-zag field 31 on the inner side of the cylindrical part 30 of the head of a hot-gas engine. In Fig. 7 the inner side of the wall portion comprising these projecting parts is developed. Also in this form of construction, similarly to the construction shown in Fig. 1, the head contains a cylindrical internal casing which, however, is not represented for an easy view. Owing to the presence of this internal casing the gases to be heated, in the case of the displacer (not represented) moving upwards, enter the space between the internal casing and the cylindrical heated wall portion of the head, according to the arrows. Of course, there are a large number of ducts extending in various directions between the pin-shaped elevations. It appears, however, that the gases generally follow the way of the least resistance, so that they will substantially follow the paths indicated by arrows in Fig. 6. In this construction, also, the supply ducts 32 extend between the outlet ducts 33. This construction has the advantage that a very large heat exchanging surface is obtainable within a definite diameter $l$, the length of the gas paths $m$ being smaller than ⅓ of any of the dimensions (diameter and height) $l$ and $k$ of the heat-exchanging wall.

What is claimed is:

1. A heat exchanger for a hot-gas piston engine comprising a first cylindrical wall having a predetermined height and a predetermined diameter, said first cylindrical wall having a plurality of inlet channel means disposed substantially axially of said first cylindrical wall for subdividing a flow of medium which flows thereinto in a generally axially direction with respect to said first cylindrical wall, said inlet channel means each having a side thereof opening out on the outer surface of said first cylindrical wall and an end thereof having an obstructing wall therein, said first cylindrical wall also having a plurality of outlet channel means disposed substantially axially of said first cylindrical wall and arranged alternately with respect to said inlet channel means said outlet channel means each having a side thereof opening out on the outer surface of said cylindrical wall and an end thereof having an obstructing wall therein, and a second cylindrical wall fitted around said first cylindrical wall, said second cylindrical wall having a plurality of slots therein which align alternately with said side openings of said inlet channel means and said outlet channel means, respectively, when said exchanger is assembled and a third cylindrical wall surrounding said second cylindrical wall.

2. A heat exchanger for a hot-gas piston engine as claimed in claim 1 wherein said slots are spaced in said second cylindrical wall a distance which at a maximum is no greater than ⅓ of one of said predetermined dimensions of said first cylindrical wall.

3. A heat exchanger assembly for a hot-gas piston engine comprising an outer cylindrical casing, a first cylindrical wall inside said casing and spaced therefrom, said first cylindrical wall having a plurality of inlet channel means for subdiving a flow of medium which flows thereinto in a generally axially direction with respect to said first cylindrical wall, said first cylindrical wall also having a plurality of outlet channel means arranged alternately with respect to said inlet channel means, and a second cylindrical wall fitted around said first cylindrical wall and spaced from said outer casing, said second cylindrical wall having a plurality of slots therein which align alternately with said inlet channel means and said outlet channel means when said exchanger is assembled, and a plurality of annular ridges on the inner surface of said outer cylindrical casing.

4. A heat exchanger assembly for a hot-gas piston engine as claimed in claim 3 wherein said outer cylindrical casing has a plurality of fins affixed to the outside surface thereof, said fins being arranged in substantially parallel relationship with the axis of said cylindrical casing.

JORIS DANIEL HEIJLIGERS,
*Administrator of the Estate of Pieter Hajo Clay, Deceased.*

REFERENCES CITED

The following references are of record in the file of this patent:

UNITED STATES PATENTS

| Number | Name | Date |
|---|---|---|
| 646,406 | Anderson | Apr. 3, 1900 |
| 2,173,844 | Houdry | Sept. 26, 1939 |
| 2,272,925 | Smith | Feb. 10, 1942 |
| 2,369,993 | Turner | Feb. 20, 1945 |
| 2,371,346 | Morrow | Mar. 31, 1945 |
| 2,397,734 | Goebel et al. | Apr. 2, 1946 |
| 2,406,121 | Young | Aug. 20, 1946 |